United States Patent [19]
Schroeder et al.

[11] Patent Number: 5,187,775
[45] Date of Patent: Feb. 16, 1993

[54] COMPUTER REPRESENTATION OF NUCLEOTIDE AND PROTEIN SEQUENCES

[75] Inventors: John L. Schroeder; Michael R. Slater, both of Madison, Wis.

[73] Assignee: Dnastar, Inc., Madison, Wis.

[21] Appl. No.: 494,023

[22] Filed: Mar. 15, 1990

[51] Int. Cl.⁵ .............................................. G06F 15/66
[52] U.S. Cl. .................................... 395/155; 395/148; 340/721
[58] Field of Search ............ 364/518, 521, 522, 227.3, 364/496, 497, 500; 340/747, 750, 730, 721; 395/155, 161, 148

[56] References Cited

U.S. PATENT DOCUMENTS 4,935,354  6/1990  Hayenga et al. ................... 435/69.1
5,002,876  3/1991  Sreekrishna et al. .............. 435/69.5

Primary Examiner—Gary V. Harkcom
Assistant Examiner—Phu K. Nguyen
Attorney, Agent, or Firm—Quarles & Brady

[57] ABSTRACT

A display system for use on a digital computer is specifically designed to display information about nucleotide sequences, such as DNA sequences and the protein or amino acid sequences associated with those nucleotide sequences. The system uses a specially adapted font which includes special three letter characters representing the amino acids. The letters in the special characters are kerned for compact presentation. The use of such three letter characters, created to be of a width three times that of the remaining monospace characters in the font, allows amino acid sequences to be stored and presented with the corresponding nucleotide sequences in such a fashion that they are properly aligned and also usually legible.

19 Claims, 6 Drawing Sheets

```
ATGCAAACCGTTTTAGCGAAAATCGTCGCAGACAAGGCGATTTGGGTAGAAGCCCGC
Met Gln Thr Val Leu Ala Lys Ile Val Ala Asp Lys Ala Ile Trp Val Glu Ala Arg
```

ATGCAAAACCGTTTTAGCGAAAATCGTCGCAGACAAGGCGATTTGGGTAGAAGCCCGC
MetGlnThrValLeuAlaLysIleValAlaAspLysAlaIleTrpValGluAlaAArg

FIG. 1

ATGCAAAACCGTTTTAGCGAAAATCGTCGCAGACAAGGCGATTTGGGTAGAAGCCCGC
Met Gln Thr Val Leu Ala Lys Ile Val Ala Asp Lys Ala Ile Trp Val Glu Ala Arg

FIG. 2

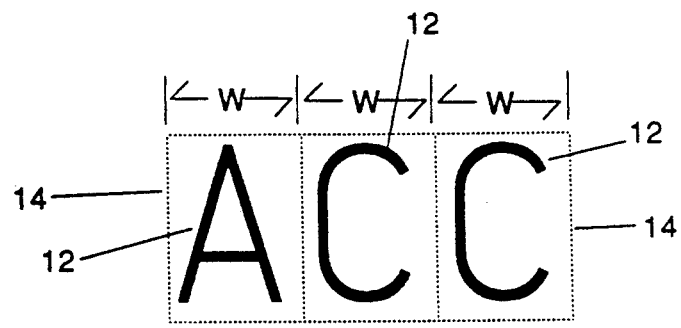
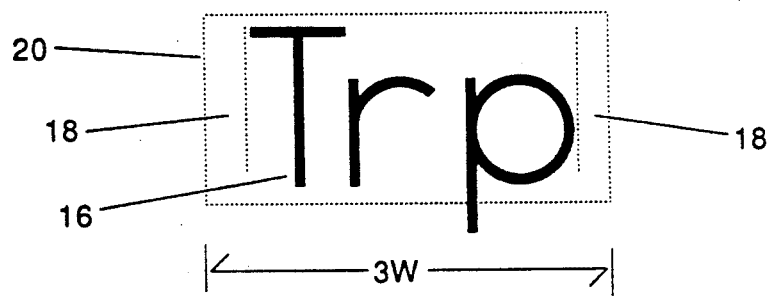
FIG. 3

Figure 4a. KeyMap for GeneFont

| Standard | GeneFont | Plus the shift key GeneFont | Plus the option key GeneFont | Plus both shift and option keys GeneFont |
|---|---|---|---|---|
| a | a | A | ∟ | Ala |
| b | b | B | ˥ | Asx |
| c | c | C | ⊤ | Cys |
| d | d | D | ⊥ | Asp |
| e | e | E |  | Glu |
| f | f | F | ⊥ | Phe |
| g | g | G | ⌐ | Gly |
| h | h | H | ↓ | His |
| i | i | I |  | Ile |
| j | j | J | ↑ |  |
| k | k | K | \| | Lys |
| l | l | L | ■ | Leu |
| m | m | M |  | Met |
| n | n | N |  | Asn |
| o | o | O | ℗ |  |
| p | p | P | ℗ | Pro |
| q | q | Q |  | Gln |
| r | r | R | ~ | Arg |
| s | s | S | ─ | Ser |
| t | t | T | • | Thr |
| u | u | U |  |  |
| v | v | V | ⊤ | Val |
| w | w | W |  | Trp |
| x | x | X | ─ | ??? |
| y | y | Y |  | Tyr |
| z | z | Z | ⌐ | Glx |

Figure 4b. KeyMap for GeneFont

| Standard | GeneFont | Plus the shift key GeneFont | Plus the option key GeneFont | Plus both shift and option keys GeneFont |
|---|---|---|---|---|
| 1 | 1 | ! | — | |
| 2 | 2 | | ⊢ | |
| 3 | 3 | # | ⊢ | ╲ |
| 4 | 4 | $ | + | ╱ |
| 5 | 5 | % | + | ╲ |
| 6 | 6 | ^ | ⊣ | ╱ |
| 7 | 7 | | ↓ | ╱ |
| 8 | 8 | * | ↓ | ╲ |
| 9 | 9 | ( | ↑ | ● |
| 0 | 0 | ) | ↑ | ● |
| - | - | — | — | |
| = | = | + | ∞ | |
| [ | [ | | = | |
| ] | ] | | = | |
| ; | ; | : | ‖ | |
| ' | ' | . | ‖ | |
| , | , | < | ◄ | |
| . | . | > | ► | |
| / | / | ? | ? | |
| ` | ` | | | |
| \ | \ | | | |

GGCTTTACACTTTATGCTTCCGGCTCGTATGTTGTGTGGAATTGTGAGCGGATAACAATTTCACACAGGAAACAGCTATGACCATGATT

-35
-10
+1
Met Thr Met Ile

FIG. 5

```
TAGCTCACTCATTAGGCACCCCAGGCTTTACACTTTATGCTTCCGGCTCGTATGTTGTTGTGGAATTGTGA
ATCGAGTGAGTAATCCGTGGGGTCCGAAATGTGAAATACGAAGGCCGAGCATACAACACACCTTAACACT
• Leu Thr His •   • Ala Pro Gln Ala Leu His Phe Met Leu Pro Ala Arg Met Leu Cys Gly Ile Val
Ser Ser Leu Ile Arg His Pro Arg Leu Tyr Thr Leu Cys Phe Arg Leu Val Cys Cys Val Glu Leu •
Val Ala His Ser Leu Gly Thr Pro Gly Phe Pro Thr Leu Tyr Ala Ser Gly Ser Tyr Val Val Trp Asn Cys Glu
Tyr Ser Val •   • Ala Gly Trp Ala Lys Cys Lys Ile Ser Gly Ala Arg Ile Asn His Pro Ile Thr
Leu Glu Ser Met Leu Cys Gly Leu Ser •   Val Lys His Lys Arg Ser Thr His Gln Thr Ser Asn His
Ala • Glu Asn Pro Val Gly Pro Lys Val Ser •   Ala Glu Pro Glu Tyr Thr Thr His Phe Gln Ser
```

FIG. 6

COMPUTER REPRESENTATION OF NUCLEOTIDE AND PROTEIN SEQUENCES

FIELD OF THE INVENTION

The present invention relates to the representation or display of nucleotide sequences and protein sequences on computer equipment such as CRT displays or print-out documents.

BACKGROUND OF THE INVENTION

The genetic material of living organisms is composed of very long polymers of chemical sub-units known as nucleotides. The inheritable genetic material of bacteria and all multicellular is made up of the polynucleotide deoxyribonucleic acid or DNA, while the polynucleotide ribonucleic acid, or RNA, serves an intermediary function in DNA activity and also serves as the inheritable genetic material of certain viruses.

DNA may be modeled as a very long chain in which each link in the chain is one of four nucleotide sub-units, adenine, thymine, cytosine, or guanine, which are respectively represented conventionally by the letters A, T, C, and G. RNA is composed of a similar chain of four nucleotides, which are the same as DNA except that uracil (U) substitutes for the T (thymine). DNA is natively double stranded, with each A on one strand being opposite a T on the other strand, and vice versa, and with each C on a strand being opposite a G on the other strand, and vice versa. RNA, which is usually single stranded, is typically made from DNA by a similar matching process, with U substituted for T. It is thus possible, and is conventional in the art, to represent nucleotide sequences, whether in print or in computer generated storage or display, by a sequence of single letters, i.e. "CTTAGATGCCTAC" etc.

In living organisms, it is one of the main functions of DNA to provide a code for the production of proteins. Proteins are also biological chains, or polymers. In proteins, the sub-units in the chain are known as amino acids. There are twenty amino acids which are used by living organisms to make proteins. These twenty amino acids are listed in Appendix 1 hereto. Amino acids are conventionally referred to in one of two ways, a three letter code or a single letter code. Both the conventional three letter code, and the conventional single letter code, for each amino acid is listed in Appendix 1.

The process of using DNA to make proteins begins with making a form of RNA, referred to as mRNA (for message RNA) from a portion of the long DNA strand. Then the mRNA is used as a template in the cell to join or link amino acids into proteins. Each set of three nucleotides of the mRNA specifies one amino acid of the protein. The three nucleotides in the mRNA is, of course, specified exactly by the sequence of nucleotides in the DNA, and the three nucleotides in the DNA which correspond to the particular amino acid are referred to jointly as a codon. The particular amino acid specified by each possible codon is well known and available in printed tables.

As more and more genes and other pieces of genetic material are analyzed and sequenced, the amount of data composed of the nucleotide and protein sequences known to science has grown enormously. It has therefore become common to store nucleotide and protein sequences on computers to make use of the ability of computers to analyze, match, or perform other useful manipulations with the nucleotide or protein sequences.

Of course, for the output of such activities to be useful to society, the output of such computerized processes must result in a representation accessible to people. Typically, of course, computers communicate their output to their users through displays, such as CRT displays, and through hard copy output, such as produced by a printer or plotter.

One useful form of such a computer display or hard copy print-out of a nucleotide sequence is the generation or matching of nucleotide, particularly DNA, sequences and protein sequences. It is most common to represent DNA sequences by the single letter nucleotides and to represent amino acids by the three letter sequences. The three letter sequences are preferred for amino acids, since they are better recognized by users. Shown in FIG. 1 is a representation of such a sequence as it conventionally would appear in the prior art.

In FIG. 1, the sequence of nucleotides and amino acids are presented in a so-called monospace font. This terminology implies that each character of the font takes up just the same width on the page, or the CRT screen, as any other character. So, for example, an "I" is as wide as an "M" or a "W." Since there are three letters for each codon and three letters for each amino acid, the sequences align perfectly. Unfortunately, this makes the amino acid sequence, in particular, relatively difficult to read and analyze due to the lack of spacing between the letters.

Thus with the advent of desk top publishing and other more sophisticated forms of data and graphic representations and features in computers, two subtle problems arise in the use and display of nucleotide and protein sequences. One problem is that many computer users prefer to create output products in one of the many available fonts which provide a pleasing type-like, as opposed to typewriter-like, appearance in the display or printed copy. This is impractical in the display of nucleotide sequences since, in most of those fonts attractive for making print-style appearance, the characters of the font are of a variable or proportionate width. Unfortunately, the use of a proportionate width font prevents the nucleotide and amino acid sequences from properly aligning on the display screen or printed page. While this difficulty can be avoided by use of a monospace font, such as in FIG. 1, in which each character is the same width, the typical monospace fonts available, such as the widely used Courier, are not considered very aesthetically appealing.

The second difficulty arises in the representation of the amino acids in the sequence of the protein. If the three letter abbreviations are used, to facilitate user recognition of the amino acids, the listing appears crowded and difficult to read, since each abbreviation for an amino acid takes up precisely the space of the three-nucleotide codon. The three letter amino acid abbreviations thus run continuously, with no breaks between the amino acids, as can be seen in FIG. 1.

One frequently used solution for this problem is to list the nucleotide sequence with spaces between the codons, and to leave corresponding spaces between the three letter amino acid abbreviations so that the codons and amino acids correspond. While this strategy makes the amino acid abbreviations more readible, it has the disadvantage of reducing by one quarter the amount of information which can be displayed in the same display space. Another drawback of this strategy arises from the fact that DNA sequences can have different "reading frames," which refer to the possible alternative sets of codons possible based on the same sequence depending on where the codons are deemed to start and in which direction the coding proceeds. If the spacing strategy is used, four of the other five possible reading frames cannot be represented by amino acid sequences corresponding to the DNA sequence.

SUMMARY OF THE INVENTION

The present invention is summarized in that a method of representing information about a nucleotide sequence and an associated amino acid sequence on the display device associated with a computer includes the steps of storing in the memory associated with the computer a font specifically designed for the representation of nucleotide and amino acid sequences. The font includes a subset of monospace single letter characters, representing the nucleotides of a nucleotide sequence, and a subset of identical width three letter characters representing the amino acids. The computer stores in the memory associated with it a nucleotide sequence associated with an amino acid sequence. The computer then displays on the display device associated with the computer the nucleotide sequence in association with the amino acid sequence, the nucleotide sequence being displayed with the subset of monospace single letter nucleotide characters of the font and the amino acid sequence being displayed with the set of identical width three letter characters of the font, so that the codons formed by the nucleotide sequence are aligned with the amino acid sequence.

It is an object of the present invention to provide a method of displaying information about nucleotide and amino acid sequences on the display device associated with the digital computer in such a fashion that the amino acid sequences displayed in conjunction with nucleotide sequences are readily readable by casual viewers of the sequence information.

It is another object of the present invention to provide a method of displaying information about nucleotide and amino acid sequences in such a fashion that all possible reading frames of a single nucleotide sequence can have their corresponding amino acid sequences displayed in conjunction with the nucleotide sequence.

It is yet another object of the present invention to provide a display system for a digital computer including characters specifically designed for the representation of biochemical information on the display means associated with the computer.

It is another object of the present invention to allow the digital computers to store information regarding DNA sequences in as efficient and as compressed a fashion while still allowing for easily human perceivable display of the information stored in that fashion.

Other objects, advantages, and features of the present invention will become apparent from the following specification when taken in conjunction with the accompanying drawings.

BRIEF DESCRIPTION OF THE DRAWINGS

FIG. 1 is a listing of a nucleotide sequence and the corresponding amino acid sequence displayed using a font in accordance with the prior art.

FIG. 2 is a display of a nucleotide sequence and the accompanying amino acid sequence displayed in accordance with the method of the present invention.

FIG. 3 is an enlarged representation of the details of the character spacing of the nucleotide and amino acid character set for use within the present invention.

FIGS. 4a and 4b are a catalog of the characters of the character set constructed in accordance with the display method of the present invention.

FIG. 5 illustrates a nucleotide sequence displayed in conjunction with some of the special symbols used to illustrate genetic information processing.

FIG. 6 illustrates a single nucleotide sequence displayed in conjunction with corresponding amino acid sequences for all possible reading frames of the amino acid sequence.

DETAILED DESCRIPTION OF THE INVENTION

As mentioned above, FIG. 1 contains a nucleotide sequence, under which is printed the amino acid sequence corresponding to the nucleotide sequence. For example, the three nucleotide codon "ATG" codes for the amino acid methionine, which is represented by the letters "Met." In FIG. 1 the characters are represented in a prior art monospace font. The particular font used is Courier. This printed display of FIG. 1 was prepared utilizing a computerized word processing program. To cause the computer to display the three-letter abbreviation "Met," it was necessary to enter into the computer file three separate characters, i.e. first "M," then "e," and finally "t." Each letter of the three-letter abbreviation was thus stored as a single character, or byte, in the computer and its associated memory devices. As can be seen in FIG. 1, the amino acid abbreviations line up directly underneath each triple set of codons in the nucleotide sequence. This alignment arises from the fact that each letter in the nucleotide sequence and each letter in the amino acid sequence take up the same width on the page. However, because there is no spacing between the amino acid abbreviations, the amino acids appear jumbled together and can be difficult to read.

By contrast, FIG. 2 illustrates the same nucleotide sequence and the same amino acid sequence displayed utilizing the display method of the present invention. In FIG. 2, the nucleotide sequence, on the top line, is again displayed in a monospace font. This particular monospace font is the GeneFont(tm) font from the assignee of the present invention. In the monospace font for the nucleotide sequence as shown in FIG. 2, each character is made up of a single letter in a fashion that is normal to computer representation of linguistic words and letters. In FIG. 2 there is, again, a three letter abbreviation for each amino acid associated with each of the codons in the nucleotide sequence. For example, again, the abbreviation "Met" appears underneath the codons "ATG." However, in the display method illustrated in FIG. 2, the three letters of each of the abbreviations for the amino acids are not constructed by three separate individual characters. Instead the abbreviation "Met," in the fashion that it appears in FIG. 2, is stored in the memory of the computer which generated FIG. 2 as a single ASCII character or byte. The character stored in the computer memory is represented on the computer screen, and on the hard copy printout of that display shown in FIG. 2, as a three letter character. In other words, a single ASCII character, instead of referring to a single letter of the alphabet, as is usually the case, causes the display of a unitary specially designed three letter character. Each of these special three letter characters is an abbreviation for one of the twenty possible amino acids. In constructing these special three letter characters to represent the amino acids of a protein sequence, blank space has been left, inside of the character description, on each side of the three letters which make up the character. The net result of this spacing is, as may be seen in FIG. 2, the creation of spaces on the display, between the amino acids, even while the amino acid sequence lines up directly under the codons corresponding to the individual amino acids. The result, as may be viewed in FIG. 2, is the transmittal of the identical information as contained in FIG. 1, with the automatic maintenance of the alignment between the codons and the amino acids, but spacing is maintained between the three letter representations of the amino acids, such that they now can be readily read by a casual reader.

Illustrated in FIG. 3 are some of the details of the design of these special display characters illustrating the spacing necessary to accomplish this objective. Shown in the top line of FIG. 3 is a representation of a codon, or three individual nucleotides, as they would appear in a nucleotide sequence such as that of FIG. 1. Each of the three characters 12 of this sequence are made up of individual single letter monospace characters. In the creation of monospace characters, in a fashion well known to the art, an equivalent width on the display is created for each character in the monospace character set. In fact, illustrated in FIG. 3 is an outline box 14, which illustrates the vertical and horizontal space into which this single letter character is designed to fit. As can be seen in the top half of FIG. 3, a single character width "W" is assigned for each of the three nucleotide characters represented by the codon "ACC." The net result of that is that the three characters together occupy a width on the display equal to three times the standard monospace character width "W."

Shown in the bottom half of FIG. 3 is the three letter single character representation 16 of the abbreviation for the amino acid tryptophan, i.e. "Trp." This three letter character 16 has been specially constructed so that it will be printed on hard copy or displayed on a display medium of a computer as a triplet, or three letter character. In other words, a single ASCII character stored in the computer memory or data file causes the representation of the entire three letter abbreviation 16 as seen in the bottom half of FIG. 3. This special three letter character 16 has been specifically constructed to be of a defined size and spacing in relation to the monospace characters of the nucleotide sequence shown in the top half of FIG. 3. In particular, the entire area taken up by the three letter character 16 is equal in width to three times the value "W," as illustrated in FIG. 3. Furthermore, the tree letters of the abbreviation, i.e. the "T," and the following letters "r" and "p" have been kerned. By this process, the letters are brought closer together so as to occupy less horizontal distance on the display than would be occupied by three individual monospace single letter characters. This kerning is best illustrated by noticing that the upper right hand portion of the "T" extends close to or even over the top of the "r." This kerning of these three letters makes these three letters in the character occupy less horizontal space on the display than is allocated for the entire character and than occupied by the three single letter characters for the nucleotides just above them. Thus the outline of the entire space allocated to the three letter character 16 is indicated at 20 in FIG. 3. Since the character space 20 is larger than the space occupied by the actual letters, the character 16 includes blank space 18 located on each side of the area occupied by the actual letters in the character 16. In other words the entire three letter character is larger than the three letters in the character, so as to create the blank spaces 18 on each side of the three letter representation. It is these blank spaces 18 which ensure the spacing between the abbreviations for the amino acids as viewed in an actual sequence in FIG. 2.

The inherent spacing between the letters in the three letter character for the amino acids solves another deficiency in prior art methods of representing nucleotide and amino acid sequence. This difficulty arises from the fact that in a nucleotide sequence, it is not always clear how to group the nucleotides into groups of three to from codons. These groupings are referred to as the reading frame of the nucleotide sequence. For example, in the sample sequence of FIGS. 1 and 2, if the reading frame began with the second nucleotide "T", rather than the first "A", the first codon would be "TGC", and the second would be "AAA", etc. A third reading frame would begin with the third nucleotide "G" with a first codon "GCA". In addition, since the sequence may also be read in the opposite direction, there are a total of six reading frames.

This problem of reading frames complicates the display of nucleotide and amino acid sequences. For example, one solution to the reading difficulty in FIG. 1 would be to put blank spaces between each codon and each amino acid. While this is wasteful so space, since it allocates a full 25% of the display area to blank spaces, it can and is often used in such displays where the rading frame is known. Often, however, it is desired to show the different possible reading frame amino acid sequences, and this cannot be done if the blank space strategy is employed, since the nucleotides cannot then logically be grouped in condons.

Shown in FIG. 6 is a nucleotide sequence displayed in conjunction with amino acid sequences for all six possible reading frames. Note that because of the inherent spacings between the three-letter amino acid characters, all the amino acid sequences can be easily read even though the nucleotide sequence does not contain unneeded spaces. Thus not only is the need for extraneous spaces avoided, but all possible biochemical information about the nucleotide sequence has been conveyed while maintaining readability.

A complete character set of a font useful within the method of the present invention is illustrated in FIGS. 4a and 4b. This is a keyboard mapping of the GeneFont(tm) font. The character set illustrated in FIGS. 4a and 4b was formulated using a Macintosh computer and utilizing the Postscript character description language. The Postscript character description language, as is understood by those of skill in the art, is a descriptive computer language for defining the outlines of characters which may be then displayed on any Postscript compatible device. At present, both computers and display devices for computers are available from a variety of manufacturers which are capable of utilizing Postscript characters and outputting those characters on a host of display devices. Display devices useful within the present invention would include not only CRT display devices for imaging of characters for human viewing, but also hard copy devices such as printers and plotters and the like, commercial versions of which are currently available which are Postscript compatible. It is to be understood that the present invention is also capable of execution in other non-Postscript character description languages, of which several others are known to those of ordinary skill in the art. It is also to be understood that the present invention may be used with other font representational methodologies including outline fonts and bitmapped fonds. All that is required is that the font technology permit both single and triple space characters and multi-letter characters.

It is also envisioned that such special three-letter characters may be displayed in a variety of fashions within the same computer system. In the Macintosh family of computers, for example, the display is driven by a program known as Quickdraw, which is not Postscript compatible. Thus for Macintosh computers, a display system in accordance with the present system, such as GeneFont, requires not only a set of Postscript character outline descriptions but also a bit-mapped approximation of those characters for use by Quickdraw in making the actual screen display.

It is not necessary for the designer of a font system for use within the display method of the present invention to actually create by hand the character descriptions of the Postscript compatible characters. Commercially available systems exist for designing fonts which are Postscript compatible. The font system illustrated in FIGS. 4a and 4b was designed using the Fontographer software system from Attsys Corporation.

It is thus a central advantage of the display system of the present invention including the specialized font that a single ASCII character is automatically represented using this font as a three letter single character abbreviation. Thus the amino acid identification can be stored as single ASCII characters in memory or in a data storage device, rather than three letter combinations. This reduces by two-thirds the necessary storage space dedicated to the storage of the amino acid sequence information by the memory means associated with the computer. Such memory or storage devices include disc drives, tape drives, RAM, ROM and other forms of volatile or nonvolatile memory which may be accessed by a digital computer during its operations.

Another advantage of the implementation of the present system is the manner in which the keyboard characters coding for the three letter character abbreviations have been selected. It is well known that the ASCII character set includes more characters (i.e. 256) than are necessary to represent the English alphabet, including upper and lower case letters, the numerals, and all usual marks of punctuation. To allow the computer user to access the other possible characters in the ASCII set, which are used for specialized purposes on various computers and applications, most state of the art computer key boards have specialized keys, sometimes referred to as "command" or "option" keys, which change the character set which is entered into the computer upon the depressing of a letter key contained within a standard typewriter-style computer keyboard. These keys are analogous to the "shift" key which changes a key from a small case to a large case character for the same letter. These command or option keys change the ASCII character communicated to the computer button on the keyboard from the standard English letter to an entirely different ASCII character. Utilizing the normal keyboard mapping system contained within the operating system of the Macintosh computer, the font as illustrated in FIGS. 4a and 4b has mapped the three letter amino acid characters so that they are entered from the keyboard of the computer by depressing the "option" and "shift" keys at the same time that the single letter abbreviation for that amino acid is depressed. Thus those biochemists who are already familiar with the single letter abbreviations for the amino acids can promptly enter amino acid information, utilizing this display system, by entering the appropriate single letter digit into their computer, utilizing the option and shift keys in addition.

This system is of particular advantage for computer systems which store font or character description information separately from the data to be displayed. This is an attribute of the Macintosh operating system in that fonts or character descriptions are stored separately from the data, which simply has an attribute listing the appropriate font. Since character description information then does not have to be stored with each character to be displayed, but is only stored at one central resource which can be accessed by the operating system, not only does the amount of storage space necessary for the storage of nucleotide or amino acid sequence become smaller, but also the same character descriptions are available regardless of the application program in which the information is stored. Thus it becomes feasible to transmit nucleotide or amino acid sequence from application program to application program, i.e. from a sequence analysis program to a word processor, while still maintaining the integrity of the data and the true representation of the nucleotide and amino acid sequences, as long as the font information transfers with the underlying data information.

Thus it can be seen by reference to FIG. 4 that the set of characters represented by this font includes two principal distinct subsets. One subset of characters are all conventional single letter characters, each of a single mono space width. The other subset of characters are three letter characters, where the combination of the three letters corresponds to a standard abbreviation for an amino acid. These three letter characters are three times the width of the letter characters which make up the balance of the character set. The character set also includes other special characters useful for the display of molecular biological information. It is conventional in biochemical literature to represent transcription, or the creation of mRNA from DNA, by a sinuous or wavy line. Shown in FIG. 5 is a DNA sequence with the transcription area indicated in that fashion. Note that the start of transcription (at the first "A" in "AATTGT") is clearly indicated by a circular dot symbol beginning the sinuous line. The beginning of the amino acid coding region is indicated by the three letter amino acid characters. Further to the left, sites of significant molecular biological interest are indicated by boxes indicated by numerals (−35 and −10) referenced from the clearly indicated start of transcription. All this meaningful information is conveyed to the reader using the other special characters, such as the sinuous line portions, brackets, blocks, and arrows contained in the balance of the character set.

It is to be understood that the present invention is not limited to the particular embodiment illustrated herein, but embraces all such modifications and variations thereto as come within the scope of the following claims.

Appendix 1

| Amino Acid | Three-letter abbreviation | One-Letter symbol |
| --- | --- | --- |
| Alanine | Ala | A |

Appendix 1

| Amino Acid | Three-letter abbreviation | One-Letter symbol |
|---|---|---|
| Arginine | Arg | R |
| Asparagine | Asn | N |
| Aspartic acid | Asp | D |
| Asparagine or aspartic acid | Asx | B |
| Cysteine | Cys | C |
| Glutamine | Gln | Q |
| Glutamic acid | Glu | E |
| Glutamine or glutamic acid | Glx | Z |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |

We claim:

1. A method of representing information about a nucleotide sequence and an associated amino acid sequence on a display device associated with a computer also having a memory associated with the computer, the method comprising the steps of storing in the memory associated with the computer a font specifically designed for the representation of nucleotide and amino acid sequences, the font including a subset of monospace width single letter characters representing nucleotides and further including a subset of identical width three letter characters representing amino acids, the three letter characters being arranged so that each three letter character, including surrounding blank spaces, occupies the same width as three of the single letter monospace character representing the nucleotides;

storing in the memory means associated with the computer a nucleotide sequence associated with an amino acid sequence; and displaying by the computer on the display device the nucleotide sequence in association with the amino acid sequence, the nucleotide sequence being displayed using the subset of monospace single letter nucleotide characters of the font and the amino acid sequence being displayed with the subset of identical width three letter characters of the font, so that the codons formed by the nucleotides sequence are aligned with the amino acid sequence.

2. A method as claimed in claim 1 wherein in the step of storing the nucleotide sequence there is also stored the amino acid sequence, with one character being stored for each amino acid in the sequence.

3. A method as claimed in claim 1 wherein the step of storing in the memory means the nucleotide sequence and the amino acid sequence, the nucleotide sequence and the amino acid sequence are stored in ASCII code.

4. A method as claimed in claim 1 wherein the three letter characters for each of the amino acids includes bracketed blank spaces so that when the three letter character for each amino acid is displayed underneath a nucleotide codon, the three letter character for the amino acid is centered under the codon, with space on either side thereof.

5. A method as claimed in claim 1 wherein the font further includes a set of graphical characters specifically constructed so that a user may construct with the graphical characters symbols associated with the representation of molecular biological processing of genetic information.

6. A method as claimed in claim 1 wherein the three letter characters for the amino acids are mapped onto a computer keyboard so that a user may enter a one letter abbreviation for each amino acid to enter that character into the computer keyboard.

7. A method as claimed in claim 1 wherein the display step consists of display on a hard printed medium.

8. A method as claimed in claim 1 wherein the display step consists of display on a CRT screen.

9. A method as claimed in claim 1 wherein the font is stored in the memory as a set of outline character descriptions for each of the characters in the font.

10. A method as claimed in claim 9 wherein the character outlines are in the Postscript language.

11. A system for the representation of nucleotide and amino acid sequence comprising a programmable digital computer;

a memory device associated with the computer which may be accessed by the computer;

a set of character descriptions stored in the memory device, the set of character descriptions including a subset of single letter monospace characters corresponding to the nucleotides of a nucleotide sequence and a subset of three letter identical width characters corresponding to the three letter standard abbreviation of amino acids;

a nucleotide sequence stored in the memory device;

an amino acid sequences stored in the memory device;

a display means associated with the computer for displaying the output thereof; and program means stored in the memory device for causing the computer to display on the display means the nucleotide sequence using the subset of single letter characters to display the nucleotide sequence and the subset of three letter characters to display the amino acid sequence, the displayed nucleotide sequence located in association with the displayed amino acid sequence with the codons formed by the nucleotide sequence being aligned with the amino acids of the amino acid sequence.

12. A system as claimed in claim 11 wherein the nucleotide sequence and the amino acid sequence are stored in ASCII code.

13. A system as claimed in claim 11 wherein the three letter characters for each of the amino acids included bracketed blank spaces so that when a string of the three letter characters for each amino acid is displayed underneath a string of the nucleotides, the three letter character for each amino acid is centered under the corresponding nucleotide codon, with space on either side of the amino acid character.

14. A system as claimed in claim 11 wherein set of character descriptions further includes a set of graphical characters specifically constructed so that a user may construct with the graphical characters symbols associated with the representation of molecular biological processing of genetic information.

15. A system as claimed in claim 11 wherein the three letter characters for the amino acids are mapped onto a computer keyboard so that a user may enter a one letter abbreviation for each amino acid to enter that three letter character into the computer keyboard.

16. A system as claimed in claim 11 wherein the display means includes a display on a hard printed medium.

17. A system as claimed in claim 11 wherein the display means includes a display on a CRT screen.

18. A system as claimed in claim 11 wherein the character description are stored in the Postscript language.

19. A system as claimed in claim 11 wherein the three letters in each of the three letter characters are abbreviations for the amino acids.

* * * * *